(12) United States Patent
Amatoury et al.

(10) Patent No.: US 11,819,148 B2
(45) Date of Patent: *Nov. 21, 2023

(54) DRINKING VESSEL AND VENTILATION MEMBERS

(71) Applicant: b.box for kids developments Pty Ltd, Mulgrave (AU)

(72) Inventors: Sylvain Jacques Amatoury, Mulgrave (AU); Lisa Edlund Tjernberg, Mulgrave (AU)

(73) Assignee: b.box for kids developments Pty Ltd, Notting Hill (AU)

( * ) Notice: Subject to any disclaimer, the term of this patent is extended or adjusted under 35 U.S.C. 154(b) by 153 days.

This patent is subject to a terminal disclaimer.

(21) Appl. No.: 17/369,324

(22) Filed: Jul. 7, 2021

(65) Prior Publication Data

US 2021/0330106 A1 Oct. 28, 2021

Related U.S. Application Data

(63) Continuation of application No. 17/050,157, filed as application No. PCT/AU2019/050314 on Apr. 9, 2019, now Pat. No. 11,058,241.

(30) Foreign Application Priority Data

May 7, 2018 (AU) .............................. 2018203169

(51) Int. Cl.
*A47G 19/22* (2006.01)
*B65D 47/06* (2006.01)
(Continued)

(52) U.S. Cl.
CPC ....... *A47G 19/2272* (2013.01); *B65D 47/066* (2013.01); *B65D 47/2043* (2013.01);
(Continued)

(58) Field of Classification Search
CPC .............. A47G 19/2272; B65D 47/066; B65D 47/2043; B65D 47/32; B65D 51/165; B65D 51/1683; F16K 7/12; F16K 31/521
See application file for complete search history.

(56) References Cited

U.S. PATENT DOCUMENTS

| | | |
|---|---|---|
| 5,343,889 A | 9/1994 | Jaw |
| 5,906,288 A | 5/1999 | Dwinell |

(Continued)

FOREIGN PATENT DOCUMENTS

| | | |
|---|---|---|
| CN | 202011528 U | 10/2011 |
| CN | 102482010 A | 5/2012 |

(Continued)

OTHER PUBLICATIONS

Translation of CN 103496499 provided by Espacenet. https://worldwide.espacenet.com/publicationDetails/originalDocument?CC=CN&NR=203461287U&KC=U&FT=D&ND=4&date=20140305&DB=EPODOC&locale=en_EP (Year: 2023).*

Primary Examiner — James N Smalley
(74) Attorney, Agent, or Firm — Young Basile Hanlon & MacFarlane, P.C.

(57) ABSTRACT

A vent assembly for use with a drinking vessel includes a flexible ventilation member configured to sealingly engage an opening in the drinking vessel and having an air passage extending therethrough, wherein the ventilation member is configured to allow an inflow of air when pressure within the drinking vessel enters a negative pressure state in relation to pressure outside the drinking vessel, wherein the ventilation member comprises one or more venting portions disposed within the air passage. A vent actuator is operably coupled to the ventilation member and configured to change a state of the ventilation member between a ventilation state and a closed state, wherein the vent actuator is integral with the (Continued)

ventilation member and configured to bring the ventilation member into the ventilation state upon contact with a cam portion.

19 Claims, 14 Drawing Sheets

(51) Int. Cl.
*B65D 47/20* (2006.01)
*B65D 47/32* (2006.01)
*B65D 51/16* (2006.01)
*F16K 7/12* (2006.01)
*F16K 31/52* (2006.01)

(52) U.S. Cl.
CPC ........... *B65D 47/32* (2013.01); *B65D 51/165* (2013.01); *B65D 51/1683* (2013.01); *F16K 7/12* (2013.01); *F16K 31/521* (2013.01)

(56) References Cited

U.S. PATENT DOCUMENTS

| | | | |
|---|---|---|---|
| 6,135,311 | A | 10/2000 | Panec et al. |
| 6,164,314 | A | 12/2000 | Saputo et al. |
| 8,336,724 | B2 | 12/2012 | Yamashita et al. |
| 9,220,360 | B2 | 12/2015 | Arai et al. |
| 9,238,529 | B1 | 1/2016 | Newman et al. |
| 10,390,643 | B2 | 8/2019 | Anderl |
| 2003/0145888 | A1 | 8/2003 | Lin |
| 2009/0014072 | A1* | 1/2009 | Zhang ................... A47C 27/081 5/655.3 |
| 2009/0255944 | A1 | 10/2009 | Yamashita et al. |
| 2010/0059516 | A1* | 3/2010 | Parker ................... B65D 17/401 220/268 |
| 2011/0266281 | A1 | 11/2011 | Thiemann et al. |
| 2013/0037510 | A1 | 2/2013 | Tamarit Rios |
| 2015/0069065 | A1 | 3/2015 | Lohn |

FOREIGN PATENT DOCUMENTS

| | | | |
|---|---|---|---|
| CN | 103496499 A * | 1/2014 | ................ A45F 3/18 |
| CN | 104229285 A | 12/2014 | |
| CN | 106395118 A | 2/2017 | |
| EP | 2476628 A1 | 7/2012 | |
| EP | 3214012 A1 | 9/2017 | |
| JP | 2004345742 A | 12/2004 | |
| JP | 2007/148441 A | 6/2007 | |
| JP | 2007176537 A | 7/2007 | |
| JP | 2007/148441 A1 | 12/2007 | |
| JP | 2007320617 A | 12/2007 | |
| JP | 2008296989 A | 12/2008 | |
| JP | WO2007148441 A1 | 11/2009 | |
| JP | 2012-020783 A | 2/2012 | |
| JP | 2014525880 A | 10/2014 | |
| KR | 20140001821 U | 3/2014 | |
| WO | 2015/039400 A1 | 3/2015 | |
| WO | WO-2018229529 A1 * | 12/2018 | ......... A47G 19/2266 |

* cited by examiner

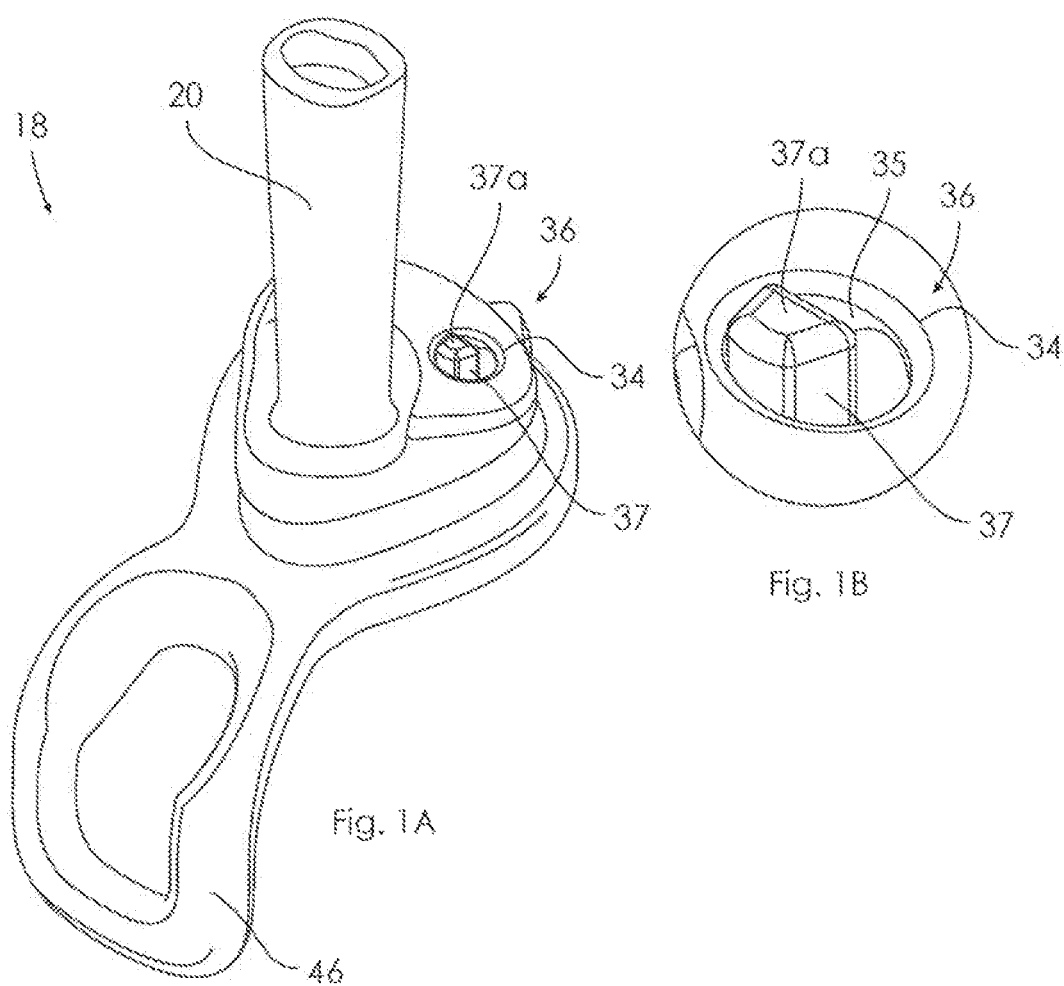

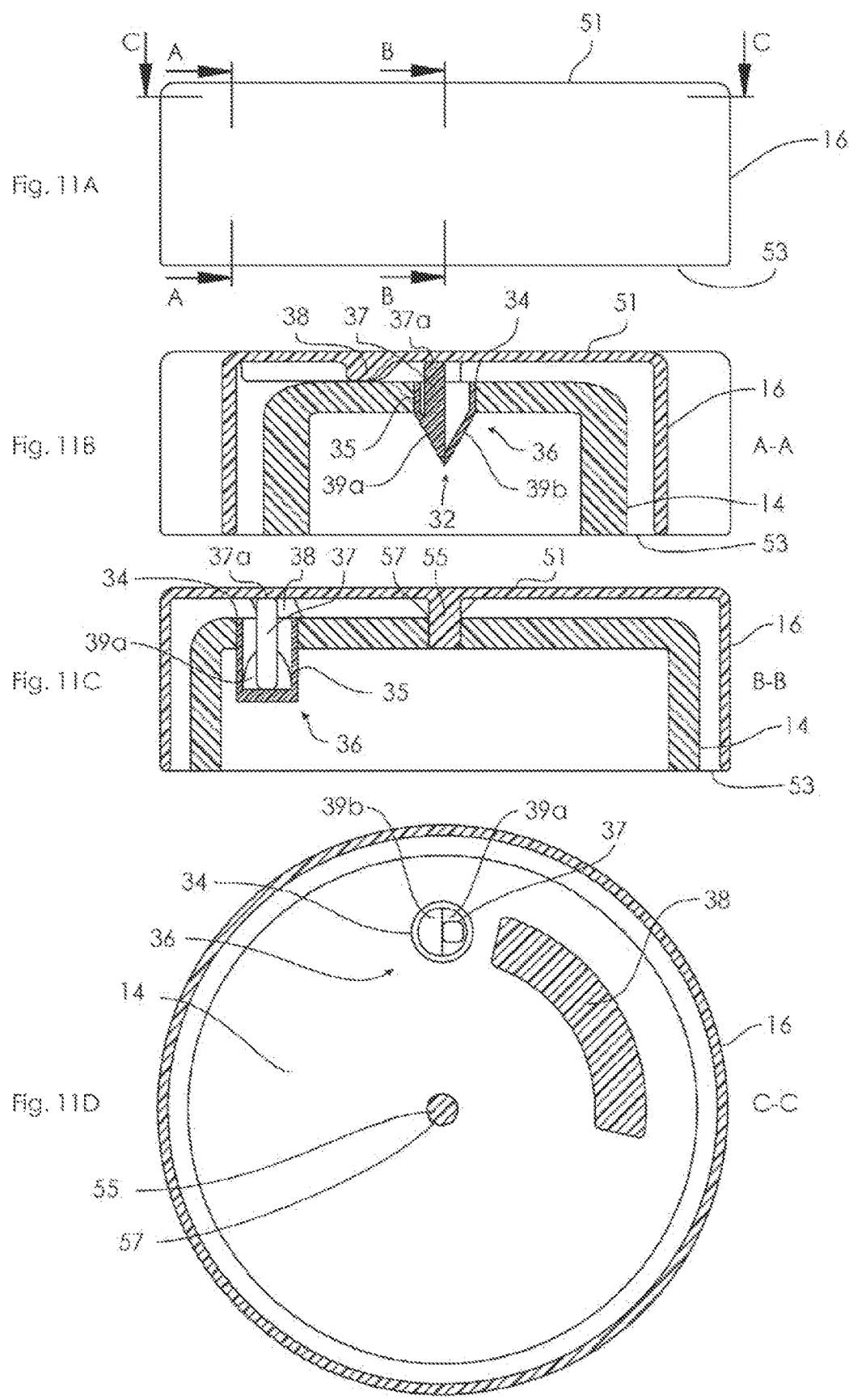

DRINKING VESSEL AND VENTILATION MEMBERS

CROSS-REFERENCE TO RELATED APPLICATION(S)

This application claims priority to and the benefit of U.S. patent application Ser. No. 17/050,157, filed Oct. 23, 2020, which is a 371 National Stage of PCT/AU2019/050314, filed Apr. 9, 2019, which claims priority to Australian Patent Application Serial No. 2018203169, filed May 7, 2018, the entire disclosures of which are hereby incorporated by reference.

TECHNICAL FIELD

The present invention relates to a drinking cup or vessel, particularly for children, having a closed lid with an incorporated straw, spout or teat to minimize liquid spills and leaks and ventilation members used therein.

BACKGROUND

Sippy cups have become a widely used drinking vessel for serving liquids to infants and young children. Sippy cups have a vessel body holding a liquid, a removable lid closing the mouth of the vessel and having a straw extending through the cap through which a child may drink the liquid. Typically, a cover is attached to the cap in order to cover and pinch off the straw to store the sippy cup when not in use. A variety of mechanisms have been deployed in the past in order to seal the sippy cup when the cover is in a closed position to minimize the liquid leaks. Similarly, various mechanisms have been deployed for venting the sippy cup when in use to enable to the liquid to be freely withdrawn through the straw by the user. There remains a need for a simple vent mechanism which enables liquid to be freely withdrawn by the user and to equalize air pressure within the cup to prevent accidental spillage and squirting yet securely seal when the cover is closed and the cup is not in use to prevent leaks and spills.

SUMMARY

In one aspect, but not necessarily the broadest aspect, the invention resides in a drinking vessel, comprising:
  a container having an open mouth and an internal cavity;
  a removable lid attachable to the mouth, the lid having at least one opening;
  a flexible ventilation member that sealing engages the at least one opening and has an air passage extending therethrough;
  a vent actuator operably coupled to the ventilation member and configured to change a state of the ventilation member between a ventilation state and a closed state; and
  a cover member disposed on the lid and moveable between open and closed positions, the cover member having a cam portion configured to contact the vent actuator during movement of the cover member to change the state of the ventilation member.

In one embodiment, the vent actuator extends at least partly above a level of a vent opening of the air passage.

In particular embodiments, the vent actuator is configured to bring the ventilation member into the ventilation state upon contact with the cam portion.

In certain embodiments, the ventilation member is configured to allow an inflow of air when pressure within the container enters a negative pressure state in relation to pressure outside the container, and configured to prevent a liquid contained in the internal cavity from leaking therethrough.

Suitably, the drinking vessel of the present aspect further comprises a flexible tubular straw or spout or teat having a fluid passageway extending therethrough. Preferably, the tubular straw or spout or teat and the ventilation member form part of an elastic straw-vent assembly (or spout-vent assembly or teat-vent assembly) having an elastic body that sealingly engages the at least one opening in the lid. More preferably, the cover pinches the flexible tubular straw or spout or teat against the lid thereby closing the fluid passageway when in a closed position.

In one embodiment, the cam portion is configured to contact the vent actuator when the cover member is at a position intermediate the open and closed positions.

In some embodiments, the ventilation member comprises one or more venting portions disposed within the air passage, such as opposed flexible first and second venting portions angularly and downwardly disposed within the air passage. With regard to such embodiments, the vent actuator suitably comprises a wedge portion disposed on and integral with an upper surface of one or both of the first and second venting portions and projecting upwardly therefrom. Preferably, the wedge portion is integral with a portion of a side wall of the ventilation member. More preferably, the wedge portion extends upwardly from the first and/or second venting portions to define a free end configured to contact the cam portion.

In particular embodiments, the vent actuator is integral with the lid. For such embodiments, the vent actuator is suitably disposed within the air passageway and attached to the lid by a bridging portion.

In other embodiments, the vent actuator comprises an elongate member supported within the air passageway by a support portion extending across the at least one opening. Preferably, the elongate member has an annular flange at an end portion thereof for contacting the support portion.

In a further aspect, the invention resides in vent assembly for use with a drinking vessel, comprising:
  a flexible ventilation member configured to sealingly engage at least one opening in the drinking vessel and having an air passage extending therethrough; and
  a vent actuator operably coupled to the ventilation member and configured to change a state of the ventilation member between a ventilation state and a closed state in response to a force exerted thereon.

In one embodiment, the force is exerted by a cam portion disposed on a cover member and configured to contact the vent actuator during movement of the cover member.

In particular embodiments, the vent actuator extends at least partly above a level of a vent opening of the air passage.

In some embodiments, the ventilation member is configured to allow an inflow of air when pressure within the drinking vessel enters a negative pressure state in relation to pressure outside the drinking vessel, and configured to prevent a liquid contained in the drinking vessel from leaking therethrough.

Suitably, the vent assembly of the present aspect further comprises a flexible tubular straw or spout or teat having a fluid passageway extending therethrough.

Suitably, the ventilation member comprises one or more venting portions disposed within the air passage, such as opposed flexible first and second venting portions angularly and downwardly disposed within the air passage. Preferably, the vent actuator comprises a wedge portion disposed on and integral with an upper surface of one or both of the first and second venting portions and projecting upwardly therefrom. More preferably, the wedge portion is integral with a portion of a side wall of the ventilation member. Even more preferably, the wedge portion extends upwardly from the first and/or second venting portions to define a free end.

In other embodiments, the vent actuator is integral with the lid. In this regard, the vent actuator is suitably disposed within the air passage and attached to the lid by a bridging portion.

In one embodiment, the vent actuator comprises an elongate member supported within the air passageway by a support portion extending across the opening. Suitably, the elongate member has an annular flange at an end portion thereof for contacting the support portion.

Further features and/or aspects of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings outlined below.

FIG. 1A is a perspective view of the elastic straw-vent assembly showing a pull tab, a ventilation member and a vent actuator for use in the drinking vessel of FIGS. 2 to 4.

FIG. 1B is an enlarged view of the ventilation member and vent actuator of FIG. 1A.

FIG. 11A is a front view of a further embodiment of a drinking vessel of the invention showing a cover in a position which does not engage the ventilation member in a closed sate.

FIG. 11B is a section view taken along line A-A of FIG. 11A.

FIG. 11C is a section view taken along line B-B of FIG. 11A.

FIG. 11D is a section view taken along line C-C of FIG. 11A.

DETAILED DESCRIPTION

Figure 2A:
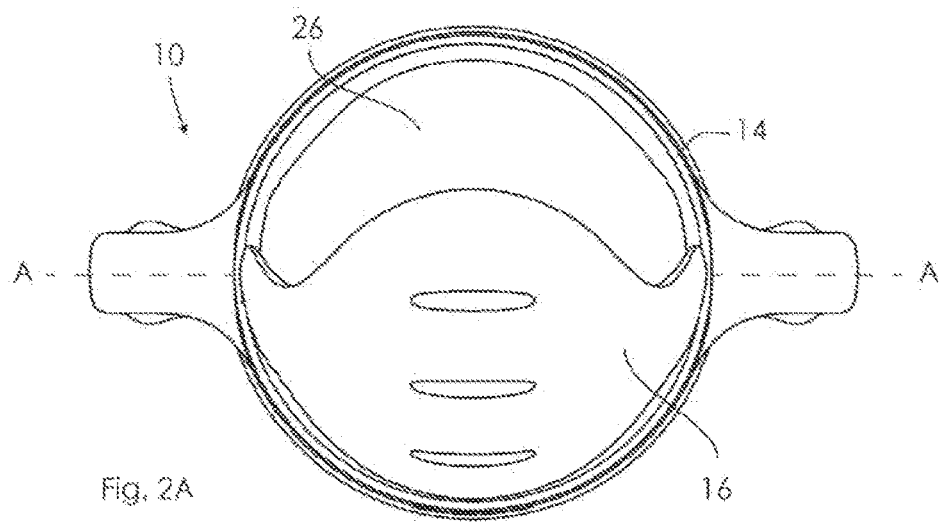
FIG. 2A is a top plan view of an embodiment of a drinking vessel of the invention showing a cover thereof in a closed position.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Elements of the invention are illustrated in concise outline form in the drawings, showing only those specific details that are necessary to understand the embodiments of the present invention, but so as not to provide excessive detail that will be obvious to those of ordinary skill in the art in light of the present description.

In this specification, adjectives such as first and second, top and bottom, upwards and downwards, and the like may be used solely to distinguish one element or action from another element or action without necessarily requiring or implying any actual such relationship or order. Words such as "comprises" or "includes" are intended to define a non-exclusive inclusion, such that a method or apparatus that comprises a list of elements does not include only those elements but may include other elements not expressly listed, including elements that are inherent to such a method or system. Additionally, and referring to the drawings, like numbers indicate like elements throughout the views.

Figure 3A:
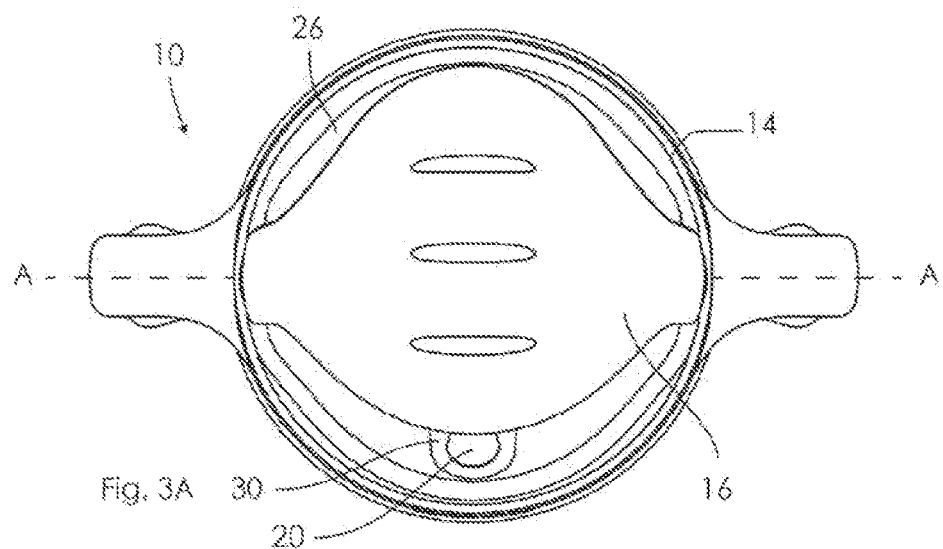
FIG. 3A is a top plan view of the drinking vessel of FIG. 2A showing the cover in an intermediate position.
Figure 3B:
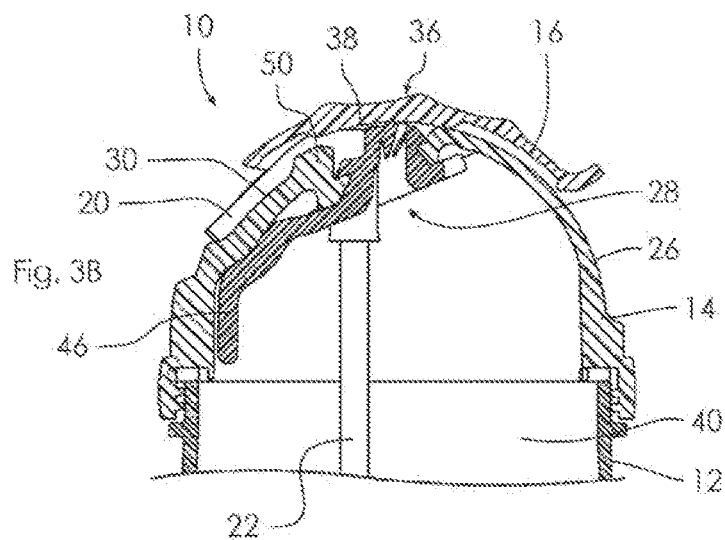
FIG. 3B is a section view of the drinking vessel of FIG. 2A showing the cover in the intermediate position.
Figure 3C:
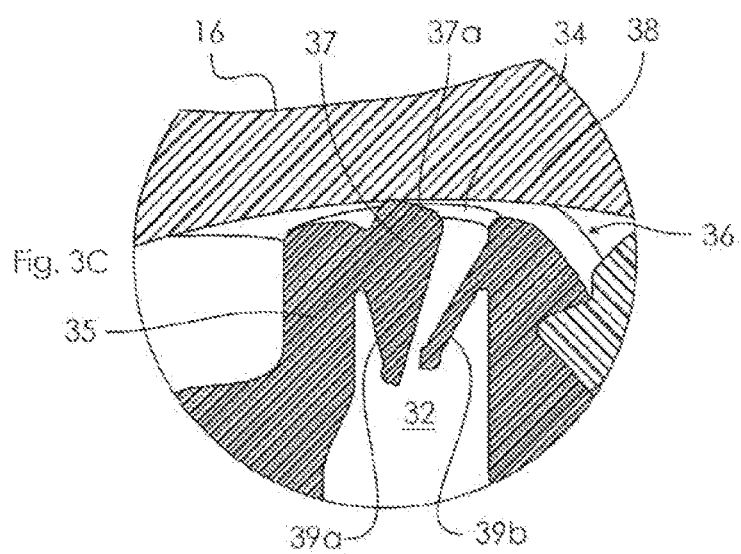
FIG. 3C is an enlarged section view of the drinking vessel of 2A showing a ventilation member thereof in a ventilation state.
Figure 4A:
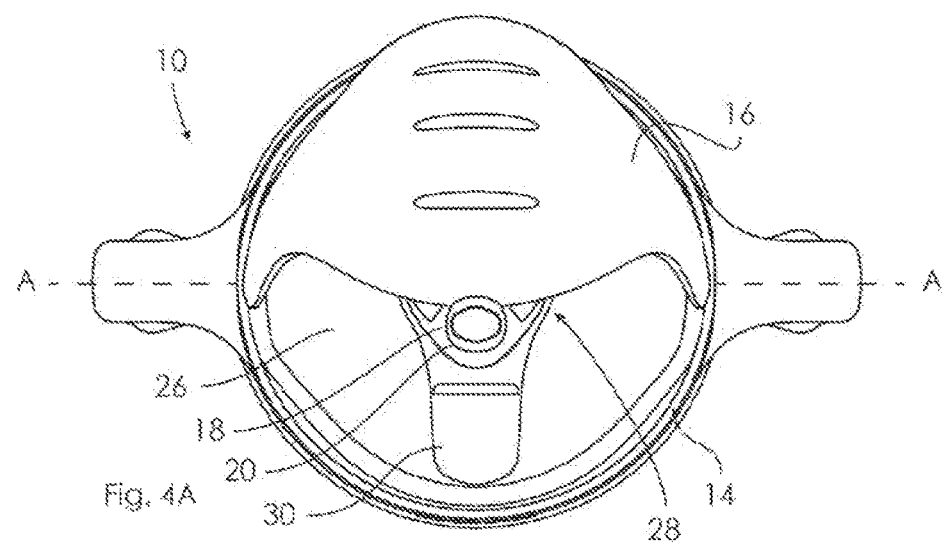
FIG. 4A is a top plan view of the drinking vessel of FIG. 2A showing the cover in an open position.
Figure 4B:
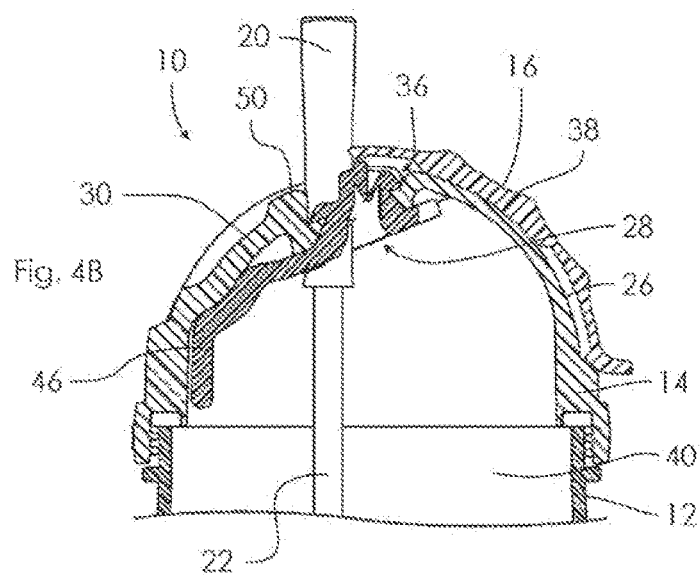
FIG. 4B is a section view of the drinking vessel of FIG. 2A showing the cover in the open position.
Figure 4C:
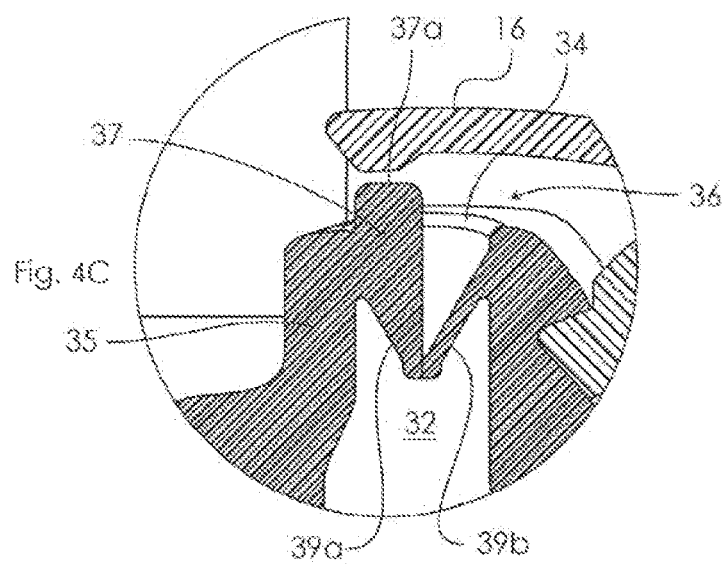
FIG. 4C is an enlarged section view of the drinking vessel of 2A showing a ventilation member thereof in the closed state.

An embodiment of a drinking vessel 10 of the present invention is shown in FIGS. 2, 3 and 4 in closed, intermediate and open positions respectively. The drinking vessel 10 is made up of four main components, namely a container in the form of a cup 12 for holding a liquid and an internal cavity 40 provided with an open mouth and a removable lid 14. The lid 14 is screwingly engaged to the mouth of the cup 12 by first and second reciprocal threaded portions. A cover 16 is moveably mounted to the lid 14. In the embodiment provided, the cover 16 is pivotably mounted as rotatable about a transverse axis A. In FIGS. 4A-4C, the cover 16 is shown in the open position exposing an elastic or resiliently deformable straw-vent assembly 18 and allowing a flexible tubular straw 20 to upwardly extend as illustrated. An elongate flexible tube 22 is further connected to the flexible tubular straw 20. In particular embodiments not illustrated herein, the elongate flexible tube 22 may further have a weighted end portion, so that liquid may be withdrawn from the cup in both an upright or normal position as shown, as well as an inverted position. In other embodiments, a spout or teat can replace the straw 20 and in such embodiments the straw-vent assembly 18 will be understood to be an elastic or resiliently deformable spout-vent assembly or an elastic or resiliently deformable teat-vent assembly respectively.

In the embodiment provided, the cup 12 is preferably made of a clear or transparent plastic while the lid 14 and cover 16 may be made of a brightly colored plastic material. The lid 14 has a generally semi-circle or hemispherical shaped dome 26 having at least one opening in the form of central inlet/outlet opening 28 into which the elastic straw-vent assembly 18 is inserted with a recessed groove 30 aligned generally perpendicular to axis A in top plan view and extending outwardly or laterally from the opening 28. The cover 16 may rotate about axis A as shown in FIGS. 2 to 4. The cover 16 is in the shape of a segment of a semi-circle shell generally following the contour of the dome 26. When the cover 16 rotates to the closed position shown in FIG. 2, the flexible tubular straw 20 folds into the groove 30 and is pinched closed preventing liquid from leaking from the straw when the cup 12 is tipped.

Figure 2B:
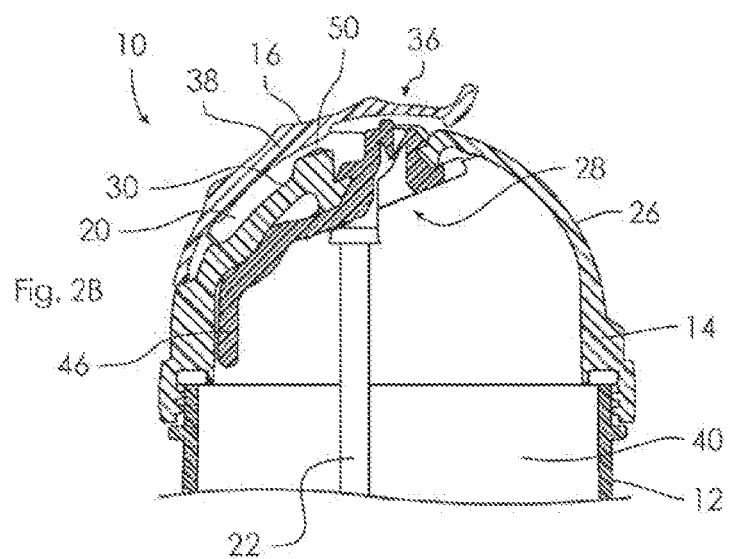
FIG. 2B is a section view of the drinking vessel of FIG. 2A showing the cover in the closed position.

FIGS. 2B, 3B and 4B each illustrate an enlarged partial cross-sectional view of the drinking vessel 10. In FIG. 2B, the cover 16 is in the closed position with the flexible tubular straw 20 folded into the groove 30 which is formed in the dome 26 of the lid 14. In this position, the flexible straw 20 is folded over and pinched between a cam or projection 38 formed on an inner surface of the cover 16 and a ridge 50 formed on the lid 14 adjacent the upper end of the groove 30. In the closed position, the internal passageway of the straw 20 is pinched closed. The elastic straw-vent assembly 18 is provided with a ventilation member 36 having a cylindrical inner side wall 35 that defines an air passage 32 extending therebetween, the ventilation member 36 operable between a ventilation or open state and a closed state. The external end of the air passage 32 forms a vent opening 34 in the ventilation member 36. It should be understood that in the closed state air can travel into the drinking vessel 10 when there is a negative pressure within the drinking vessel 10. It should also be appreciated that in other embodiments, the lid 14 can comprise more than one opening 28 in which the straw, spout or teat is inserted through one opening and the ventilation member is inserted through another opening.

The ventilation member 36 comprises opposed flexible and impervious first and second venting leaflets or portions 39a, 39b disposed within the air passage 32. Each of the first and second venting portions 39a, 39b extend downwardly and angularly inwards or medially from the vent opening 34 from opposite sides of the vent opening 34, such that their respective end portions abut or are disposed face to face in surface contact to define a slit therebetween. By virtue of this arrangement, the first and second venting portions 39a, 39b inhibit or prevent any through passage of air and/or liquid between them in the closed state and where they are resiliently urged or biased into the closed state. The first venting portion 39a is further provided with a vent actuator or a vent opening portion 37 having a wedge- or pin-shaped body which is disposed on, and integral with, an upper surface thereof, the vent actuator 37 extending upwardly therefrom so as to define a free end 37a that is positioned at least partly above a level of the vent opening 34. As shown in FIGS. 1 to 4, the vent actuator is integral with a portion of the inner side wall 35 of the ventilation member 36. It should be appreciated that in other embodiments the ventilation member 36 can comprise a single venting leaflet or portion disposed within the air passage 32 or more than two venting leaflets or portions disposed within the air passage 32. For example, the ventilation member 36 can comprise a cross cut such that the ventilation member 36 comprises two slits and four venting leaflets or portions. Furthermore, it should be appreciated that the one or more ventilation leaflets or portions can have other shapes. For example, the one or more ventilation leaflets or portions can have one or more curved or rounded portions, such as the dome shaped valve shown in FIGS. 16A-16D comprising four ventilation leaflets or portions 39a, 39b, 39c, 39d.

Figure 2C:
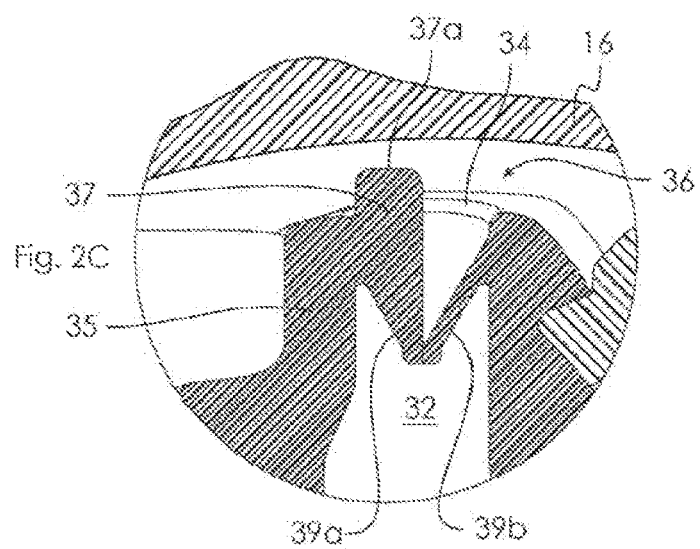
FIG. 2C is an enlarged section view of the drinking vessel of 2A showing a ventilation member thereof in a closed state.

When the cover 16 is in the open position shown in FIGS. 4A-4C or in the closed position shown in FIGS. 2A-2C, the ventilation member 36 is in the closed state such that the air passage 32 and the vent opening 34 are not in fluid communication so as to be open to atmosphere. When the cover 16 is moved to the intermediate position, shown in FIGS. 3A-3C, a projection or cam 38 formed on an inner surface of the cover 16 overlies and contacts the free end 37a of the vent actuator 37 which elastically deforms so as to pivot medially or inwardly such that there is reciprocal and relative lateral or outward movement of the first venting portion 39a away from the second venting portion 39b. In this arrangement, the ventilation member 36 is now in the ventilation state, which facilitates the passage of air between the internal cavity of the cup 12 and outside thereof (and vice versa) by way of the air passage 32.

As will be apparent to the skilled person, the present arrangement of the ventilation member 36 prevents fluid from being discharged through the straw 20 as a result of pressure build up in the cup 12, when the cover 16 is initially opened by a user. As described above, the vent actuator 37 temporarily converts the ventilation member 36 from the closed position to the ventilation position during opening of the cover 16, such that the ventilation member 36 allows equalization of the pressure between the internal cavity of the drinking vessel 10 and the atmosphere while the fluid passageway of the straw 20 remains closed. This feature is particularly beneficial when a partially full drinking vessel 10 is heated, for example, by the sun whilst the cover 16 closed. The release of any build up of internal pressure before unpinching of the straw 20 prevents fluid within the drinking vessel 10 being squirted or ejected out of the straw 20 as the cover 16 is opened.

The inner end of air passage 32 opens into the internal cavity 40 collectively defined by the cup 12 and the lid 14. It will be appreciated that the first and second venting portions 39a, 39b serve to normally seal the air passage 32 closed in the event that the container is tipped and the inner end of the air passage 32 is exposed to liquid, as alluded to earlier. Accordingly, the ventilation member 36 will preferably eliminate or reduce leakage. A negative pressure differential across the first and second venting portions 39a, 39b of greater than about 6 inches of water will suitably cause the slit between the venting portions 39a, 39b to open by lateral pivotable movement thereof, allowing air to be drawn into the internal cavity 40 as the liquid in the drinking vessel 10 is withdrawn by a user through the straw 20. As such, pressure levels within the drinking vessel 10 can be equalized with atmosphere when a user is drinking therefrom.

The straw 20 similarly has a thin membrane (not shown) comprising opposed leaflets or portions formed therein that define a vertically oriented slit which opens in response to downward pressure from a user's mouth thereon. It is envisaged that alternative valve arrangements, such as those which open in respect to a pressure differential, may be included within the straw 20. The straw membrane (not shown) prevents liquid within the straw 20 and tube 22 from dripping from the straw 20 if the drinking vessel 10 is inverted with the cover 16 open and straw 20 extended. Preferably, the straw membrane (not shown) is located adjacent a free end of the straw 20 and has a convex inwardly projecting shape. The straw membrane (not shown) is configured to prevent the opening of the slit in an outward flow unless opened by the user by applying pressure from lips or mouth.

The straw-vent assembly 18 is shown in perspective view in FIG. 1 with the tube 22 and the weighted end removed. In this view, the shape of the vent actuator 37 is shown. The shape of a pull tab 46 is also illustrated. Preferably, the tab 46 is in the form of a ring which can be easily grasped by a user, enabling the user to pull the straw-vent assembly 18 out of the lid 14 so that it can be independently cleaned or replaced if damaged. The elastic body of straw-vent assembly 18 is suitably made of a polymeric material having a durometer of Shore 30-70, preferably about Shore 50.

In the embodiment illustrated in FIGS. 1-4, the straw-vent assembly 18 combines the straw 20 and the ventilation member 36 into a single integral unit. Alternatively, the straw 20 and the ventilation member 36 can be formed as separate elements each formed of an elastic material and mounted in two separate inlet-outlet openings in the lid 14. However, the combined straw-vent assembly 18 with integral tab is preferred for ease of use.

Alternative embodiments of the ventilation member 36, which can be suitable for use with the drinking vessel 10 of the hereinbefore described embodiment, as well as alternative drinking vessels, are illustrated in FIGS. 5 to 15. To this end, it is highlighted that each embodiment of the ventilation member 36 hereinafter described is operable between a closed position and a ventilation or open position by way of a vent actuator 37 through its interaction with a projection or cam 38 disposed on a moveable cover 14 of the associated drinking vessel 10.

Figure 5A:
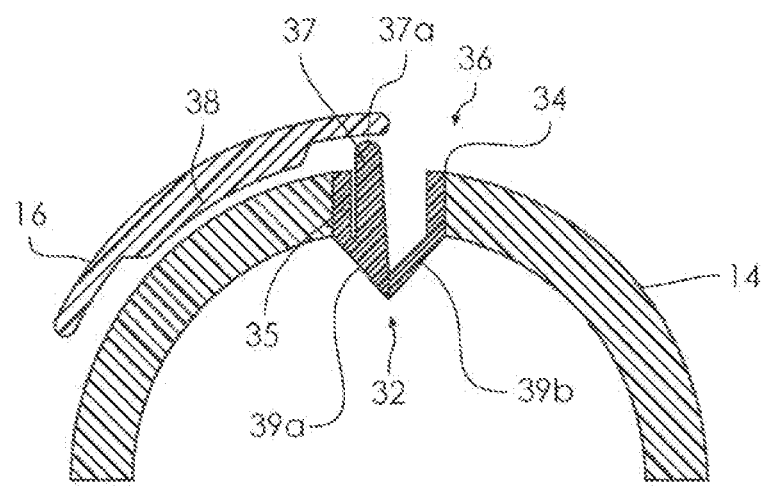
FIG. 5A is a section view of a schematic of a further embodiment of a ventilation member for use in a drinking vessel of the invention showing a cover in a position which does not engage the ventilation member and the ventilation member is in a closed state.
Figure 5B:
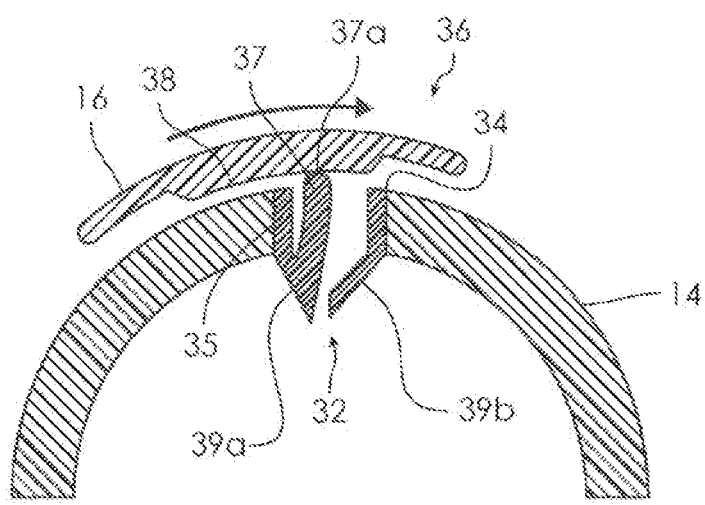
FIG. 5B is a section view of a schematic of the ventilation member of FIG. 5A showing the cover in a position which engages the ventilation member into a ventilation state.

Referring to FIG. 5, the ventilation member 36 again includes first and second venting portions 39a, 39b that extend downwardly and angularly inwards or medially from opposing portions of an inner side wall 35 thereof and below a level of the vent opening 34, such that their respective end portions abut or are disposed face to face in surface contact to define a slit therebetween. Disposed on and integral with an upper surface of the first venting portion 39a is a vent actuator 37 operably coupled thereto. As illustrated in FIG. 5, the vent actuator 37 extends upwardly from the upper surface of the first venting portion to define a free end 37a that is positioned at least partly above a level of the vent opening 34. Contrary to the aforementioned embodiment, however, the vent actuator 37 is not integral with the inner side wall 35 of the ventilation member 36. As a result of this arrangement, and upon movement of a moveable cover 16 from a closed position to an open position and vice versa, the free end 37a of the vent actuator 37 is contacted by a cam 38 disposed on an inner surface of the cover 16, when in an intermediate position. As shown in FIG. 5B, this contact with the cam 38 during its passage thereover, forces the vent actuator 37 to elastically deform and move downwards and inwards relative to the ventilation member 36a. In this manner, the vent actuator 37 effective functions as a lever arm, resulting in relative lateral or outward movement of the first venting portion 39a away from the second venting portion 39b and converting the ventilation member 36 into the ventilation state.

Figure 6A:
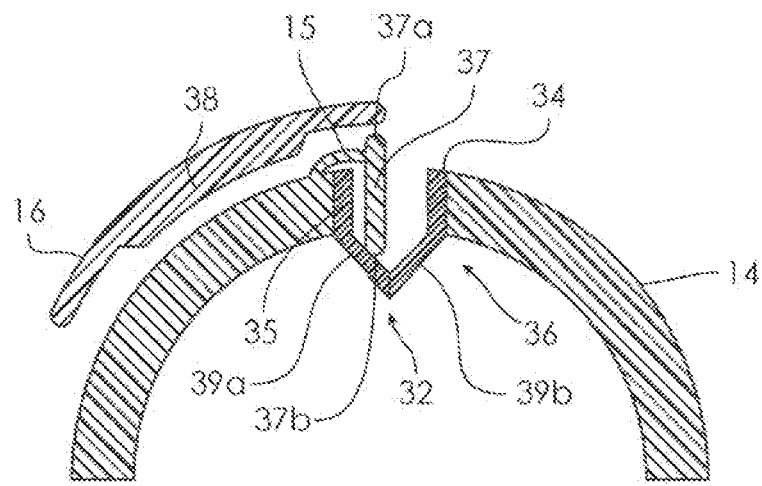
FIG. 6A is a section view of a schematic of a further embodiment of a ventilation member for use in a drinking vessel of the invention showing a cover in a position which does not engage the ventilation member and the ventilation member is in a closed state.
Figure 6B:
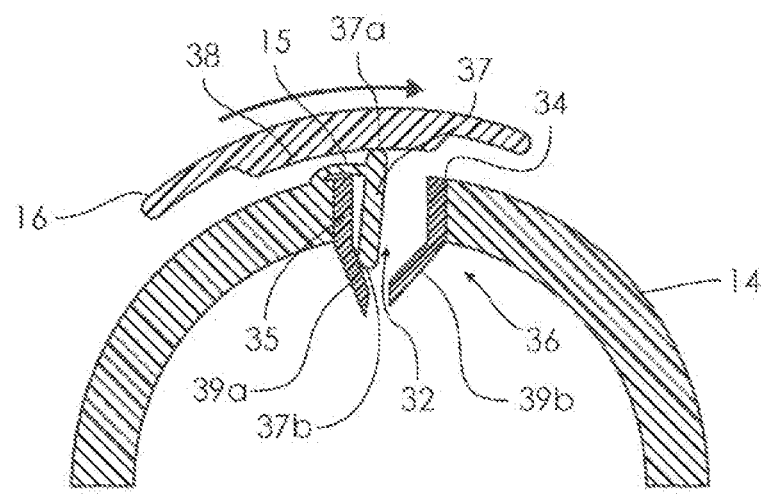
FIG. 6B is a section view of a schematic of the ventilation member of FIG. 6A showing the cover in a position which engages the ventilation member into a ventilation state.

In FIG. 6, the vent actuator 37 is no longer integral with the ventilation member 36. Rather, the vent actuator 37 is integral with the lid 14 and attached thereto by way of a flexible bridging portion 15. The bridging portion 15 extends from an outer surface of the lid 14 adjacent the vent opening 34 to a first end portion of the vent actuator 37 that is positioned above a level of the vent opening 34. The vent actuator 37 is elongate defining first and second free ends 37a, 37b and is maintained in a substantially vertical position relative to the vent opening 34 by the bridging portion 15. As can be seen from FIG. 6, the vent actuator 37 is disposed within an air passage 32 defined by the ventilation member 36, such that the second free end 37b contacts and abuts an upper surface of a first venting portion 39a when in the closed position. The first and second venting portions 39a, 39b of the ventilation member 36 extend downwardly and angularly inwards from opposing portions of an inner side wall 35 thereof and below a level of the vent opening 34, as previously described. Upon pivotal movement of a moveable cover 16 from a closed position to an open position or vice versa, the first free end 37a of the vent actuator 37 is contacted by a cam 38 disposed on an inner surface of the cover 16, when in an intermediate position. As shown in FIG. 6B, this contact with the cam 38 during its passage thereover, forces the bridging portion 15 to elastically deform and pivot inwardly, allowing for relative downwards and pivotal movement of the vent actuator 37. This translates into relative outwards and downwards movement of the first venting portion 39a away from the second venting portion 39b, which brings the ventilation member 36 into the ventilation state.

Figure 7A:
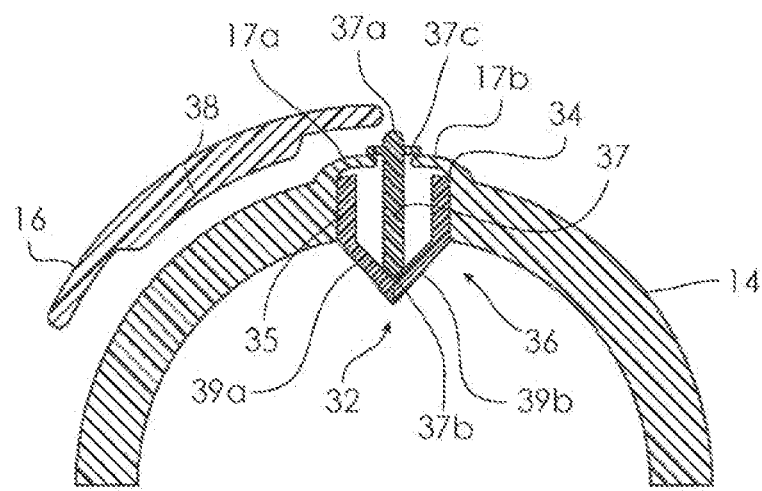
FIG. 7A is a section view of a schematic of a further embodiment of a ventilation member for use in a drinking vessel of the invention showing a cover in a position which does not engage the ventilation member and the ventilation member is in a closed state.
Figure 7B:
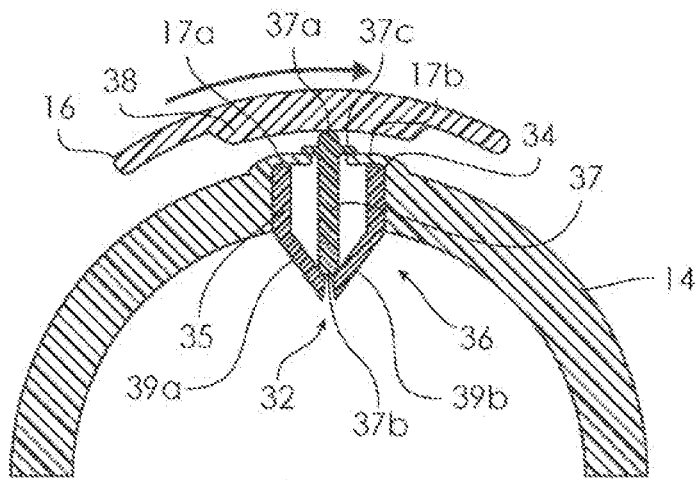
FIG. 7B is a section view of a schematic of the ventilation member of FIG. 7A showing the cover in a position which engages the ventilation member into a ventilation state.

Referring to FIG. 7, the drinking vessel embodiment provides a free floating vent actuator 37 that is not integral with the lid 14 or the ventilation member 36. Rather, the vent actuator 37 includes an elongate member that has first and second free ends 37a, 37b and is disposed centrally within an upper portion of an air passage 32. To this end, the first free end 37a of the vent actuator 37 is positioned at a level above the vent opening 34 and the second free end 37b contacts an upper surface of first and second venting portions 39a, 39b at a slit or junction therebetween. The vent actuator 37 is maintained in this position by an annular flange 37c disposed at a first end that contacts an upper surface of a pair of resiliently deformable support elements 17a, 17b. The support elements 17a, 17b extend inwardly from opposing edge portions of the lid 14 adjacent the vent opening 34 to define a space between which the vent actuator 37 is positioned. The first and second venting portions 39a, 39b are essentially arranged as per the previously described embodiment, such that upon pivotal movement of the cover 16, the first free end 37a of the vent actuator 37 is contacted by a cam 38 projecting from an inner surface of the cover 16, when in an intermediate position. As shown in FIG. 7B, this contact with the cam 38 during its passage thereover, forces the flange 37c of the vent actuator 37 against the support elements 17a, 17b which elastically deform downwardly and allows for relative downwards movement of the vent actuator 37. As a result, the second free end 37b of the vent actuator 37 is pushed or forced between the first and second venting portions 39a, 39b, thereby bringing the ventilation member 36 into the ventilation state.

Figure 8A:
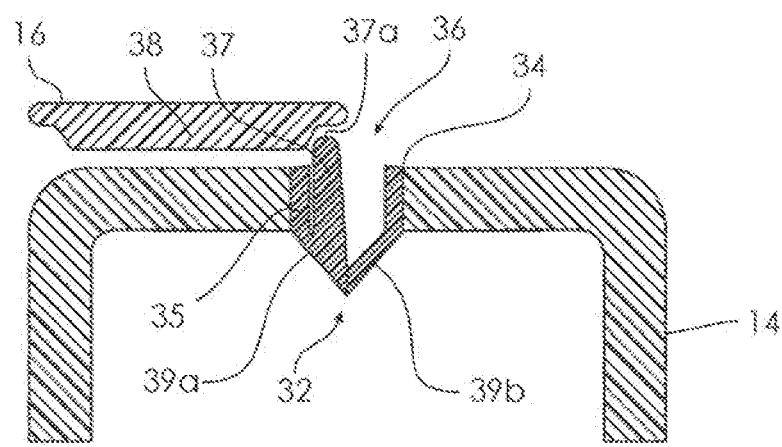
FIG. 8A is a section view of a schematic of a further embodiment of a ventilation member and a cover for use in a drinking vessel of the invention showing the cover in a position which does not engage the ventilation member and the ventilation member is in a closed state.
Figure 8B:
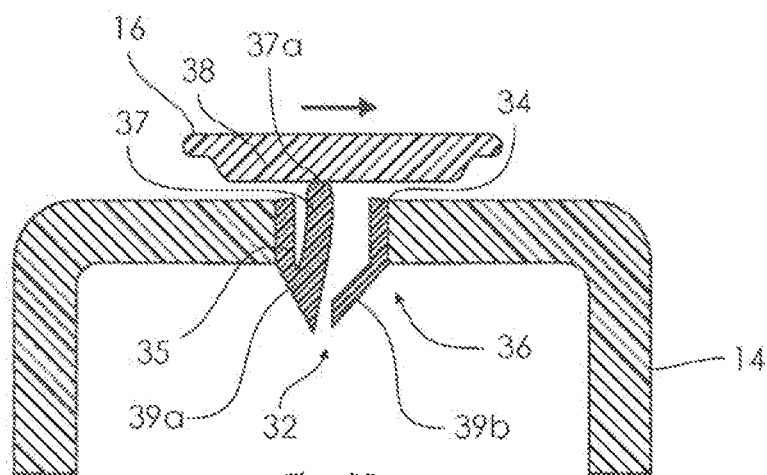
FIG. 8B is a section view of a schematic of the ventilation member of FIG. 8A showing the cover in a position which engages the ventilation member into a ventilation state.

In FIGS. 8A-B, a further embodiment of a drinking vessel 10 is illustrated. It will be apparent that the drinking vessel 10 differs from that of the previously described embodiments, in that the cover 16 is moveable in a horizontal direction from a first position to a second position substantially in the plane of the lid 14, or substantially in a plane, parallel to the plane of the lid, rather than being pivotable about a pivot point. The ventilation member 36 and vent actuator 37 are essentially identical to that illustrated in FIGS. 5A-B. To this end, movement of the cover 16 in a horizontal direction to a position intermediate the first and second positions is still sufficient for a cam 38 projecting from an inner surface of the cover 16 to contact the vent actuator 37 and bring the ventilation member 36 into the ventilation state, as previously described.

Figure 9A:
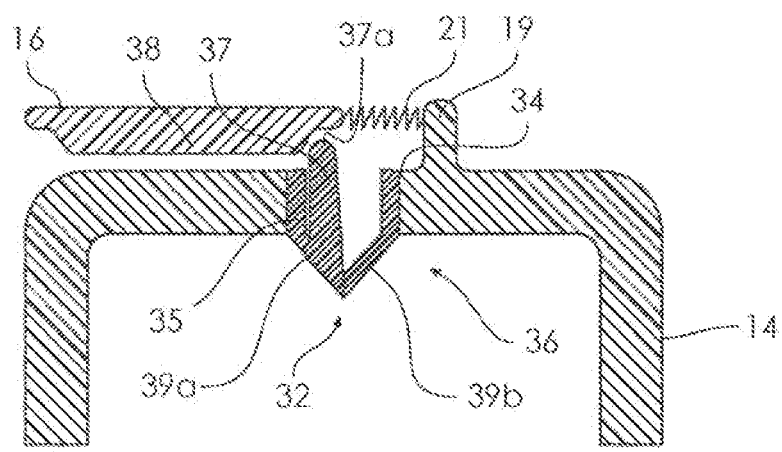
FIG. 9A is a section view of a schematic of a further embodiment of a ventilation member and a cover for use in a drinking vessel of the invention showing the cover in a position which does not engage the ventilation member and the ventilation member is in a closed state.
Figure 9B:
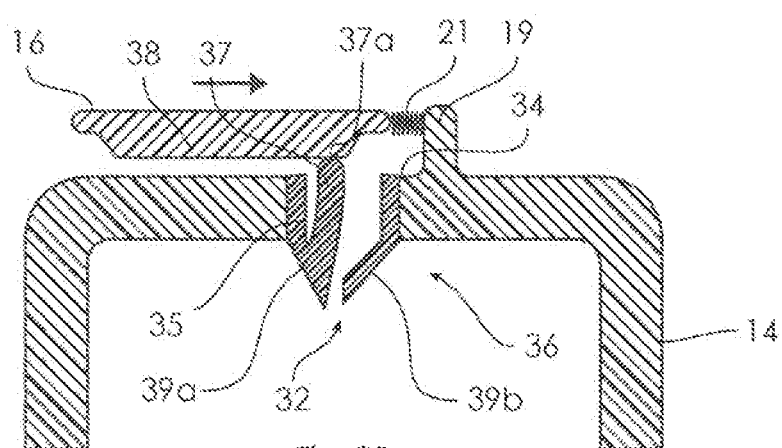
FIG. 9B is a section view of a schematic of the ventilation member of FIG. 9A showing the cover in a position which engages the ventilation member into a ventilation state.

Similar to FIGS. 8A-B, FIGS. 9A-B demonstrate a drinking vessel 10 that includes a cover 16 mounted on a lid 14 that is moveable in a horizontal direction from a first position to a second position respectively and as indicated by the arrow in FIG. 9B. The cover 16 is operably connected to an upwardly projecting stop portion 19 by way of a biasing member 21, such as a helical spring or the like, which biases the cover 16 to the first position. As described for FIGS. 8A-B above, the cover 16 further includes a cam 38 projecting from an inner surface thereof, which contacts the vent actuator 37 upon movement of the cover 16 to the second position and brings the ventilation member 36 into a ventilation state.

Figure 10A:
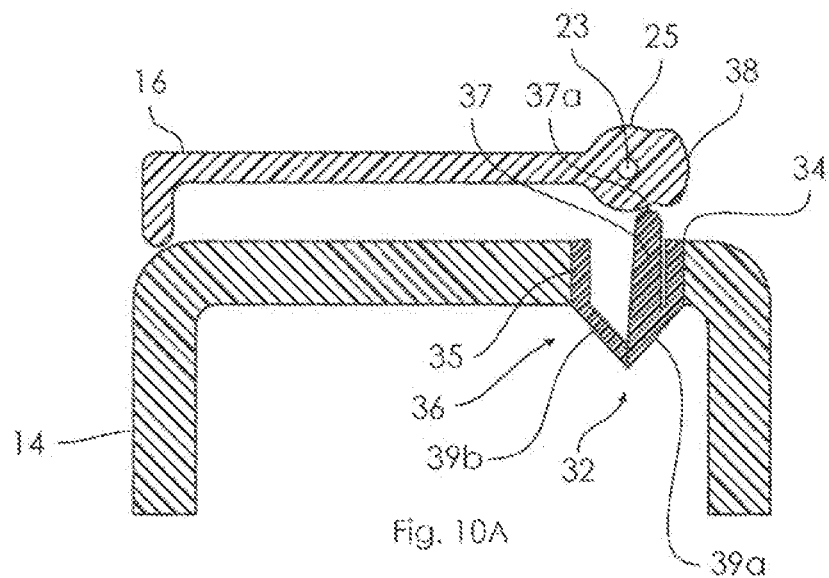
FIG. 10A is a section view of a schematic of a further embodiment of a ventilation member and a cover for use in a drinking vessel of the invention showing the cover in a position which does not engage the ventilation member and the ventilation member is in a closed state.
Figure 10B:
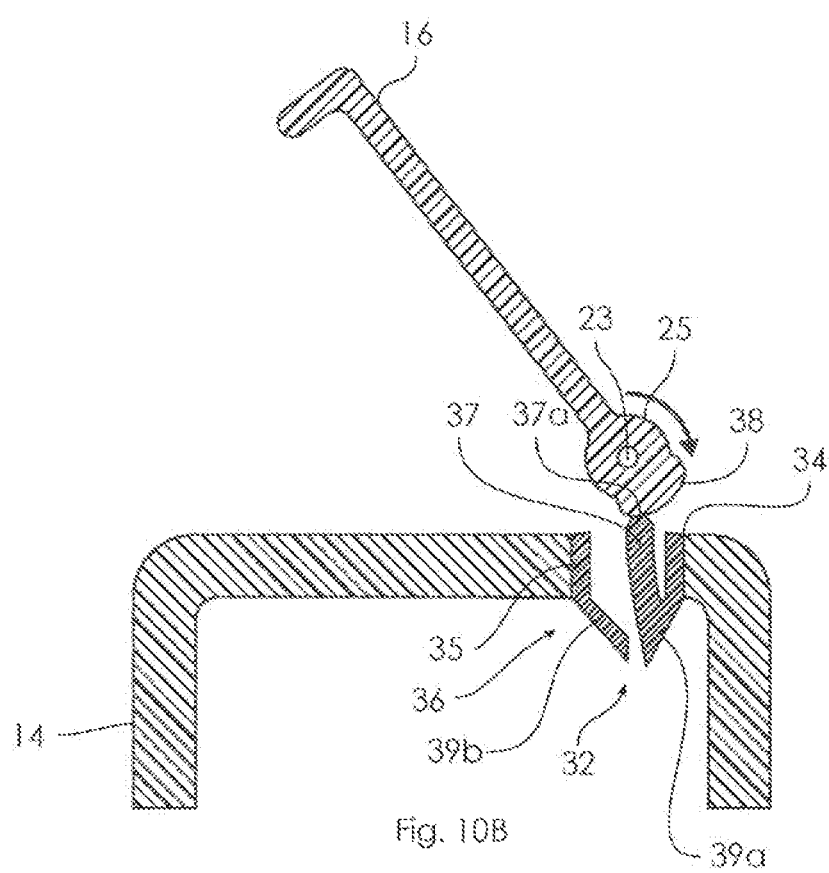
FIG. 10B is a section view of a schematic of the ventilation member of FIG. 10A showing the cover in a position which engages the ventilation member into a ventilation state.

In FIGS. 10A-B, a further embodiment of a drinking vessel 10 is illustrated. The drinking vessel 10 differs from that of the previously described embodiments, in that the cover 16 is hingedly connected to an edge portion of the lid 14 and moveable in a pivotable manner from a first position to a second position about a pivot point 23. In this manner, the pivot point 23 directly overlies the ventilation member 36 and the vent actuator 37. The ventilation member 36 and the vent actuator 37 are essentially identical to that previously illustrated in FIGS. 5, 8 and 9. The cover 16 includes a cam 38 extending outwardly from a base portion 25 thereof and adjacent the pivot point 23. To this end, movement of the cover 16 in a pivotable manner to a position intermediate the first and second positions, as illustrated in FIG. 10B, brings the cam 38 into contact with the vent actuator 37 and converts the ventilation member 36 into a ventilation state, as previously described.

FIGS. 11 and 12 demonstrate a further embodiment of a drinking vessel 10. The drinking vessel 10 includes a cylindrically-shaped cover 16 having an upper end wall 51 and a lower open portion 53 that define a space therebetween for receiving an upper portion of a lid 14 and/or a cup 12 therein. The cover 16 is rotatably coupled to the lid 14 by way of a central shaft 55 that extends downwardly from an inner surface of the upper end wall 51 and operably engages a reciprocally dimensioned central channel 57 disposed in an upper surface of the lid 14. Also extending outwardly from the inner surface of the upper end wall 51 is an elongate and arcuate or curved cam portion 38.

The lid 14 is removable from the cup 12 and further defines a cylindrical vent opening 34 therethrough. Sealingly disposed within the vent opening 34 is a flexible ventilation member 36 that has an air passage 32 extending therethrough. Similar to earlier embodiments, the ventilation member 36 includes first and second venting portions 39a, 39b that extend downwardly and angularly inwards from opposing portions of an inner side wall 35 thereof and below a level of the vent opening 34, as previously described. A vent actuator 37 having an elongate wedge- or pin-shaped body is disposed on, and integral with, an upper surface of the first venting portion 39a and extends upwardly therefrom so as to define a free end 37a that is positioned at least partly above a level of the vent opening 34, as previously described.

Figure 12A:
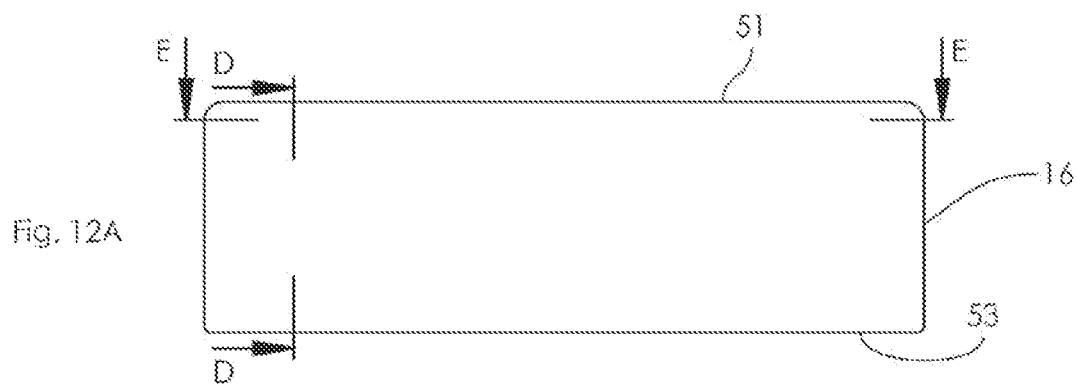
FIG. 12A is a front view of the drinking vessel of FIG. 11A showing the cover in a position which engages the ventilation member into the ventilation state.
Figure 12B:
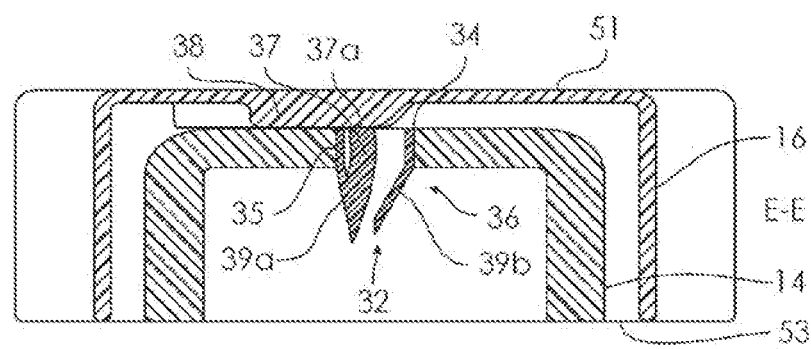
FIG. 12B is a section view taken along line D-D of FIG. 12A.
Figure 12C:
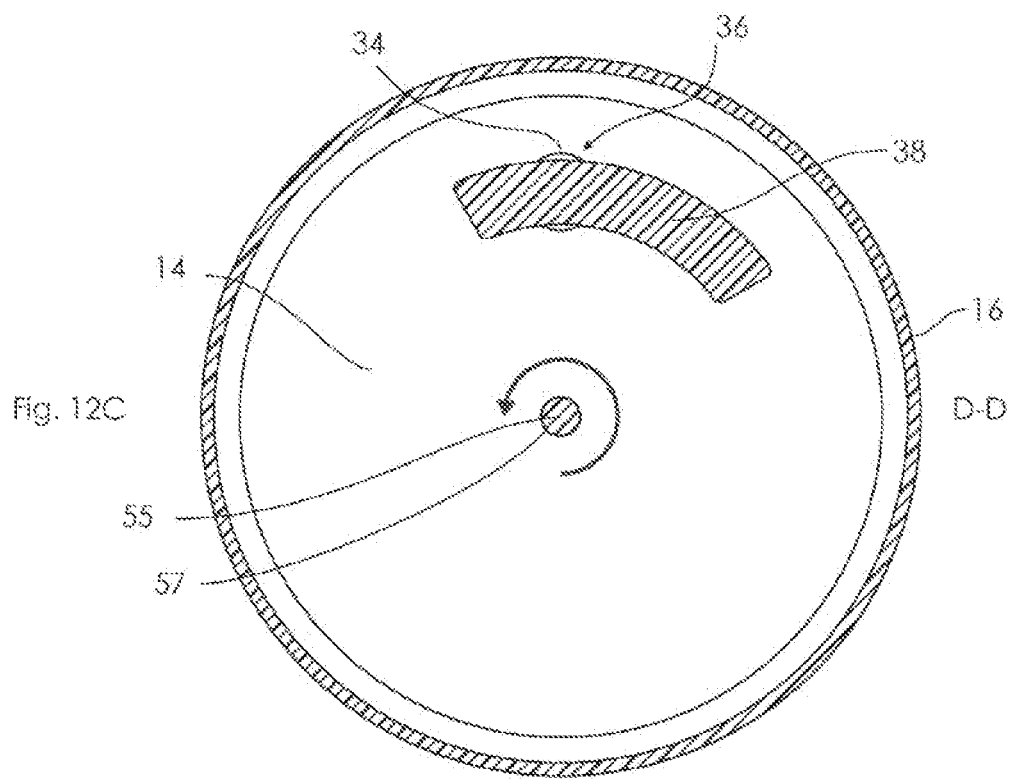
FIG. 12C is a section view taken along line E-E of FIG. 12A.

FIGS. 11A-D demonstrate the cover 16 in a closed position in which the cam 38 does not overlie and contact the vent actuator 37. As illustrated in FIGS. 12A-C, upon relative rotational movement of the cover 16 from a closed position to an open position, the free end 37a of the vent actuator 37 is contacted by the cam 38 as it passes thereover in an arcuate manner. This contact with the cam 38 during its passage thereover, forces the vent actuator 37 to elastically deform and move downwards and inwards relative to the ventilation member 36, which translates to relative lateral or outward movement of the first venting portion 39a away from the second venting portion 39b and converting the ventilation member 36 into the ventilation state.

FIGS. 13 to 15 illustrate the particular forces required to act on particular embodiments of the vent actuator 37 so as to bring an associated ventilation member 36 into a ventilation state.

Figures 13A, 13B, 13C:
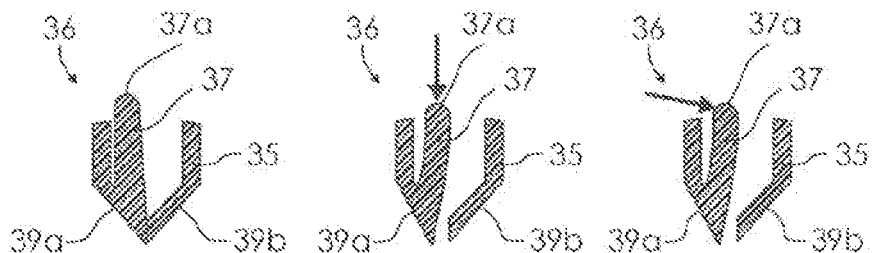
FIG. 13A is a section view of an embodiment of a ventilation member in a closed state.
FIG. 13B is a section view of the ventilation member of FIG. 13A showing the ventilation member in a ventilation state following a downward force exerted on a vent actuator.
FIG. 13C is a section view of the ventilation member of FIG. 13A showing the ventilation member in the ventilation state following an inward force exerted on the vent actuator.

FIG. 13A provides an embodiment of ventilation member 36 that is essentially identical to those illustrated in FIGS. 4 and 7 to 11 in a closed position. As shown in FIGS. 13B and 13C, a downward force and/or inward transverse force (as indicated by the arrows) imparted on the free end of the vent actuator 37 are sufficient to bring the ventilation member 36 into the ventilation state.

Figures 14A, 14B:
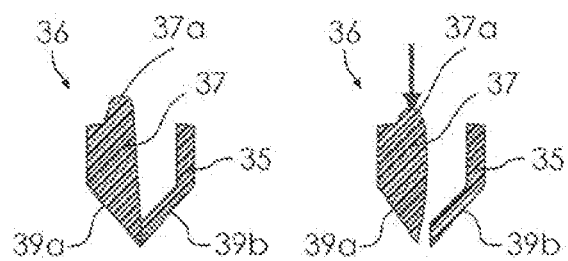
FIG. 14A is a section view of another embodiment of a ventilation member in a closed state.
FIG. 14B is a section view of the ventilation member of FIG. 14A showing the ventilation member in a ventilation state following a downward force exerted on a vent actuator.

FIG. 14A provides an embodiment of a ventilation member 36 that is essentially similar to that illustrated in FIGS. 1 to 4 in a closed position. As shown in FIG. 14B, imparting a downward force on the free end of the vent actuator 37 is sufficient to deform the body thereof and bring the ventilation member 36 into the ventilation state.

Figures 15A, 15B, 15C:
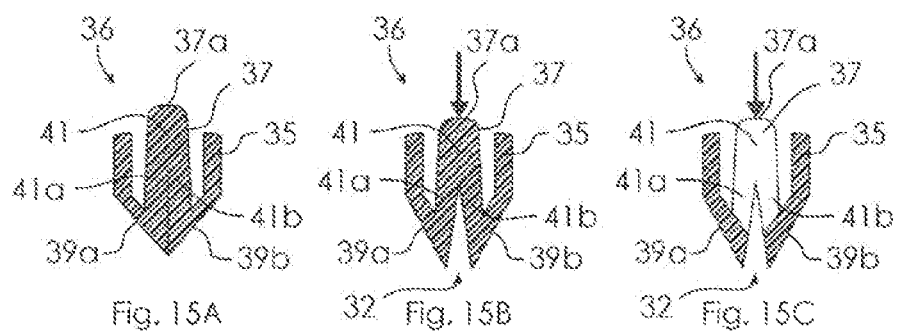
FIG. 15A is a section view of a further embodiment of a ventilation member in a closed state.
FIG. 15B is a section view of the ventilation member of FIG. 15A showing the ventilation member in a ventilation state following a downward force exerted on a vent actuator.
FIG. 15C is a section view of the ventilation member of FIG. 15A showing the ventilation member in the ventilation state and the flow of air therethrough.
Figure 16A:
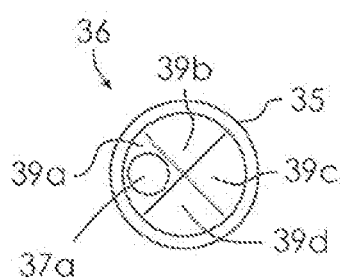
FIG. 16A is a plan view of another embodiment of the ventilation member in the form of a dome valve comprising four ventilation leaflets or portions.
Figure 16B:
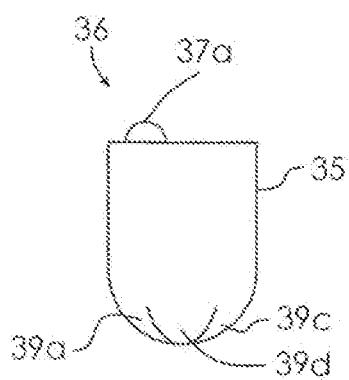
FIG. 16B is a front view of the ventilation member shown in FIG. 16A.
Figure 16C:
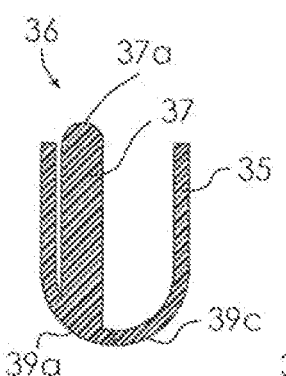
FIG. 16C is a section view of the ventilation member shown in FIG. 16A in a closed state.
Figure 16D:
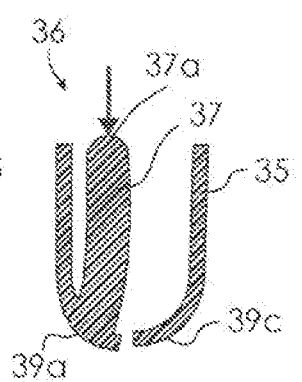
FIG. 16D is a section view of the ventilation member shown in FIG. 16A in a ventilation state following a downward force exerted on a vent actuator.

FIG. 15A provides a further embodiment of a ventilation member 36. In this particular embodiment, the vent actuator 37 comprises a body portion 41 that is centrally positioned within the air passageway and between an inner side wall 35. The body portion 41 extends upwardly to define a free end 37a thereof that is positioned above a level of the vent opening 34. Extending downwardly from the body portion 41 are a pair of flexible arm portions 41a, 41b that are disposed on respective upper surfaces of first and second venting portions 39a, 39b and extend or project upwardly therefrom. As shown in FIGS. 15B and 15C, downward pressure of the free end 37a of the body portion 41 (as shown by the arrow in FIG. 15B) causes the arm portions 41a, 41b to deform and pivot laterally away from each other. This translates to the first and second venting portions 39a, 39b moving laterally away from each other to thereby bring the ventilation member 35 into the ventilation state and allow air movement through the air passage (as indicated by the arrow in FIG. 15C).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drinking vessel, comprising:
a container having an open mouth and an internal cavity;
a removable lid attachable to the mouth, the lid having an opening;
at least one flexible ventilation member that sealingly engages the opening in the lid and has an air passage extending therethrough and comprises a flexible first venting portion and an opposed flexible second venting portion both angularly and downwardly disposed within the air passage, wherein the ventilation member is configured to allow an inflow of air when pressure within the container enters a negative pressure state in relation to pressure outside the container, and configured to prevent a liquid contained in the internal cavity from leaking therethrough;
a vent actuator operably integrally coupled to the at least one ventilation member and configured to change a state of the ventilation member between a ventilation state and a closed state; and
a cover member disposed on the lid and moveable between an open position and a closed position, the cover member having a cam portion configured to contact the vent actuator during movement of the cover member to change the state of the ventilation member,
wherein the cam portion is configured to cause a downward movement of the vent actuator when the cover member is moved from the closed position to the open position, the vent actuator causing the flexible first venting port ion to move laterally away from the opposed flexible second venting portion to bring the ventilation member into the ventilation state.

2. The drinking vessel of claim 1, wherein the vent actuator extends at least partly above a level of a vent opening of the air passage.

3. The drinking vessel of claim 1, further comprising a flexible tubular straw or spout or teat having a fluid passageway extending therethrough.

4. The drinking vessel of claim 3, wherein the tubular straw or spout or teat and the ventilation member form part of an elastic straw-vent or spout-vent or teat-vent assembly having an elastic body that sealingly engages the opening in the lid.

5. The drinking vessel of claim 3, wherein the cover pinches the flexible tubular straw or spout or teat against the lid thereby closing the fluid passageway when in a closed position.

6. The drinking vessel of claim 1, wherein the cam portion is configured to contact the vent actuator when the cover member is at a position intermediate the open position and the closed position.

7. The drinking vessel of claim 1, wherein the vent actuator comprises a wedge portion disposed on and integral with an upper surface of one or both of the flexible first venting portion and the opposed flexible second venting portion and projecting upwardly therefrom.

8. The drinking vessel of claim 7, wherein the wedge portion is integral with a portion of a side wall of the ventilation member.

9. The drinking vessel of claim 7, wherein the wedge portion extends upwardly from the flexible first venting portion and/or the opposed flexible second venting portion to define a free end configured to contact the cam portion.

10. The drinking vessel of claim 1, wherein the vent actuator comprises an elongate member supported within the air passageway by a support portion extending across the opening.

11. The drinking vessel of claim 10, wherein the elongate member has an annular flange at an end portion thereof for contacting the support portion.

12. A vent assembly for use with a drinking vessel, comprising:

a flexible ventilation member configured to sealingly engage an opening in the drinking vessel and having an air passage extending therethrough, wherein the ventilation member is configured to allow an inflow of air when pressure within the drinking vessel enters a negative pressure state in relation to pressure outside the drinking vessel, wherein the ventilation member comprises a flexible first venting portion and an opposed flexible second venting portion both angularly and downwardly disposed within the air passage; and a vent actuator operably coupled to the ventilation member and configured to change a state of the ventilation member between a ventilation state and a closed state, wherein the vent actuator is integral with the ventilation member and configured to bring the ventilation member into the ventilation state, wherein the ventilation member is configured to move to the ventilation state when a downward force is received by the vent actuator, the downward force on the vent actuator configured to move only the flexible first venting portion laterally away from the opposed flexible second venting portion.

13. The vent assembly of claim 12, wherein the vent actuator extends at least partly above a level of a vent opening of the air passage.

14. The vent assembly of claim 12, further comprising a flexible tubular straw or spout or teat having a fluid passageway extending therethrough.

15. The vent assembly of claim 12, wherein the vent actuator comprises a wedge portion disposed on and integral with an upper surface of one or both of the flexible first venting portion and the opposed flexible second venting portion and projecting upwardly therefrom.

16. The vent assembly of claim 15, wherein the wedge portion is integral with a portion of a side wall of the ventilation member.

17. The vent assembly of claim 15, wherein the wedge portion extends upwardly from the flexible first venting portion and/or the opposed flexible second venting portion to define a free end.

18. The vent assembly of claim 12, wherein the vent actuator comprises an elongate member supported within the air passageway by a support portion extending across the opening, and the elongate member has an annular flange at an end portion thereof for contacting the support portion.

19. A vent assembly for use with a drinking vessel, comprising:

a flexible ventilation member configured to sealingly engage an opening in the drinking vessel and having an air passage extending therethrough, wherein the ventilation member is configured to allow an inflow of air when pressure within the drinking vessel enters a negative pressure state in relation to pressure outside the drinking vessel, wherein the ventilation member comprises a flexible first venting portion and an opposed flexible second venting portion both angularly and downwardly disposed within the air passage; and a vent actuator operably coupled to the ventilation member and configured to change a state of the ventilation member between a ventilation state and a closed state, wherein the vent actuator is integral with the ventilation member and configured to bring the ventilation member into the ventilation state upon contact with a cam portion, wherein the vent actuator comprises a wedge portion disposed on and integral with an upper surface of one or both of the flexible first venting portion and the opposed flexible second venting portion and projecting upwardly therefrom.

* * * * *